3,046,915
FURNACE FOR THE COMBUSTION OF DOMESTIC REFUSE AND OTHER INFERIOR-GRADE FUELS
Werner Ludin, Zurich, Switzerland, assignor to L. von Roll, AG., Zurich, Switzerland, a company of Switzerland
Filed Apr. 1, 1953, Ser. No. 346,213
Claims priority, application Switzerland Apr. 26, 1952
1 Claim. (Cl. 110—15)

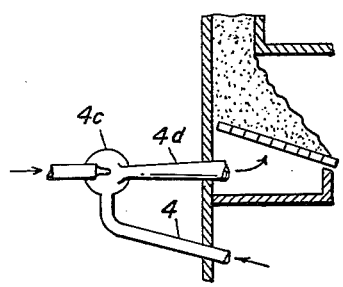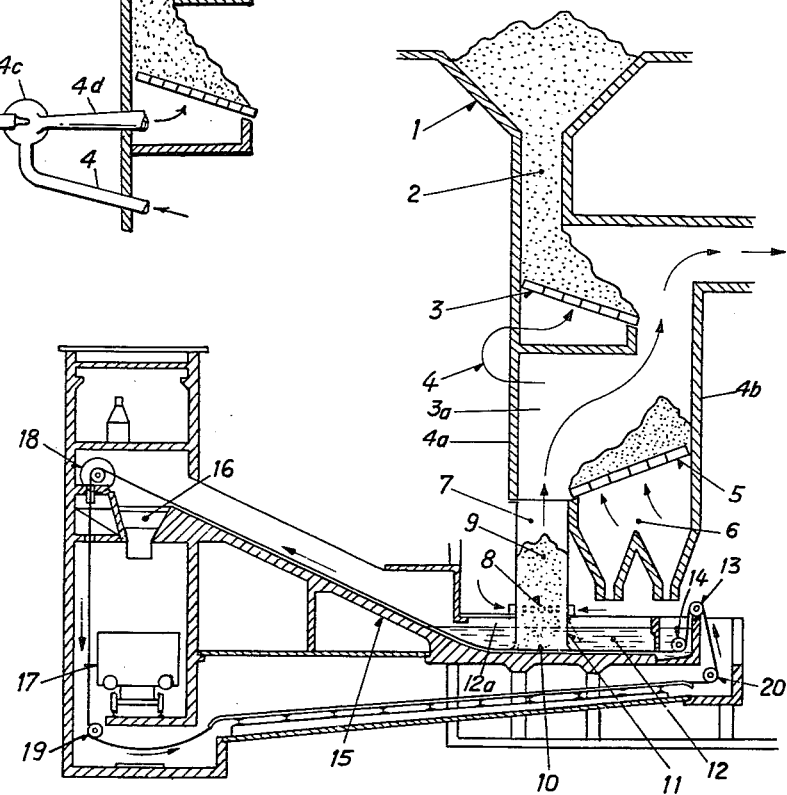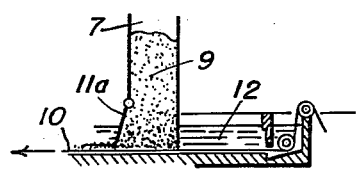

The present invention relates to a novel furnace for the combustion of domestic refuse and other inferior-grade fuels.

It is common knowledge that the complete combustion of domestic refuse and of other inferior-grade fuels is difficult. The reason for this resides partly in the high moisture and/or ash content, and partly in the heterogeneous composition of the fuel. This latter feature is particularly characteristic of domestic refuse. The calorific value of the latter depends partly on the content of readily combustible substances such as paper, cardboard, straw, etc., and partly on the content of heating furnace residues, such as coke, coal, etc., which, as experience shows, burn much more slowly than the former.

If incineration is used not only for the purpose of disposing of the refuse in a hygienic manner, but also for the purpose of utilizing the heat latent therein, the most complete possible combustion of all components must be aimed at. Therefore, any furnace or incinerator which is to satisfy these requirements must be provided with elements adapted to pre-dry the freshly charged refuse, burn the readily combustible components thereof, and, finally, burn or gasify the components of difficult combustion.

Construction of furnaces are known in which the pre-drying of the freshly charged refuse and the combustion of the readily combustible components thereof are performed on a mechanical feed grate and the combustion and/or gasification of the components of difficult combustion in a generator. Whilst the mere combination of these elements is a source of various difficulties, the generators and the automatic clinker removal systems so far designed are particularly unsatisfactory and do not ensure continuous, automatic operation of the furnace.

It is, therefore, an object of the present invention to provide a furnace for burning domestic refuse and other inferior-grade fuels which fully utilizes the components of difficult combustion and which automatically discharges the mass of clinker.

The furnace is characterized by the fact that the gas generator takes the form of a vertical shaft and is connected directly to the combustion grate, and that below the gas generator shaft a scraper chain is disposed on which the contents of the generator rest and which continuously removes the clinker.

The accompanying drawing shows several embodiments of furnace according to the invention, wherein:

FIG. 1 is a vertical section through a furnace in accordance with the present invention with parts thereof shown schematically;

FIG. 2 is a vertical section of a portion of a modified furnace schematically showing pre-heating tube means; and FIG. 3 is a vertical section of a portion of a modified furnace schematically showing a gas generator shaft with an adjustable inclined wall.

In FIG. 1, the numeral 1 designates the charging hopper, which is supplied with fresh refuse. The vertical shaft 2, which is contiguous to the hopper and provides an airtight seal for the combustion chamber or furnace 3a, leads the refuse on to the pre-drying grates 3. The combustion chamber has substantially vertical walls 4a and 4b. From the pre-drying grate 3 the refuse passes into the combustion chamber 3a and on to the combustion grate 5 and thence into the gas generator shaft 7. On the foraminous pre-drying grate 3, preliminary drying takes place, partly under the influence of the hot gases sweeping over the surface and partly by the radiation emanating from the brickwork and the hot gases. If these measures are not sufficient, it is possible to insufflate hot gases below the pre-drying grates, these gases being drawn, for example, from the space above the foraminous combustion grate 5 and from the space above the gas generator shaft 7 through a tube 4 into the injector pump 4c as shown in FIG. 2. These gases are then introduced through tube 4d into the space below the pre-drying grate 3, the arrows indicating the direction of travel of the gases. Another possibility is to blow clean air below the pre-drying grates through tube 4b in order to produce lively combustion there also. The refuse, part of it already in a state of combustion, now falls on to the principal grate 5. Here the readily combustible components burn under the influence of the cold or preheated air injected into the zones 6 located below the grate. At the end of the principal grate, all that remains are the clinker and the particles of coke and coal originating from the heating furnace residues. The gasification or combustion of these particles takes place in the adjoining shaft 7 under the influence of the stream of air or steam or other oxygen-containing gas injected through the nozzles 8. The gas generator shaft 7 is, according to the invention, designed as a vertical discharge shaft and its contents 9 rest on a scraper chain 10 conducted across the bottom of the shaft. As shown in FIG. 3, at least one side wall 11a of the lower portion of the shaft 7 is inclined in diverging relationship, preferably the rear wall of the discharge shaft 7 as viewed in the direction of travel of the chain 10. The inclination of the walls 11 at the outlet of the clinker generator is preferably such that on the one hand an even subsidence of the contents of the shaft under the influence of the movement of the chain is ensured and on the other hand the drag on the chain is as small as possible. The wall may be made adjustable as to inclination. In this way the congestion-free removal of the clinker from the shaft 7 by the chain 10 is ensured. The scraper chain 10 is designed as an endless band. The lower part of the generator 7 extends into a trough, bath or channel 12 filled with water. The bottom portion of the trough 12 is disposed below the shaft 7 while the side portions of said trough extend above the lower end of the shaft, i.e., the shaft dips into the water contained in the trough so that the clinker forming is immediately quenched for disintegration thereof. The chain 10 is introduced into the channel 12 via suitable mountings 13 and 14. The trough 12 has a bottom portion spaced from the lower end of the shaft 7, and has side walls or portions 12a which extend above the lower end of the shaft. Disposed contiguously to the channel 12 is a rising gradient or ramp 15 on which the chain lies and is suitably guided. The gradient or ramp 15 leads to a discharging station 16 through which the clinker is discharged into tipping wagons 17 which can be wheeled into position thereunder. The chain 10 is then guided back below the shaft 7 via suitable mountings 18, 19 and 20.

What is claimed is:

A furnace for continuously and automatically burning a charge of refuse and low-grade fuel material for obtaining gaseous products; comprising a pair of substantially parallel vertical walls defining a combustion chamber in part, which is substantially of greater height than width, a hopper for delivering said charge into said combustion chamber and located at the upper end of the latter, one of said vertical walls forming a part of said hopper, an exhaust flue located at the upper end of the other of said vertical walls and extending in a direction away from said hopper, a first foraminous grate below said hopper and mounted at one of its ends on said one vertical wall and extending therefrom at an angle and in downward direction into said chamber, said first grate terminating with its opposite end spaced from the other vertical wall, a second foraminous grate mounted within said combustion chamber and spaced from and below said first grate, said second grate being mounted at one end on the other vertical wall and extending therefrom at an angle and in downward direction, the opposite end of said second grate being spaced from said one vertical wall to thereby define between the opposite ends of said grates a passageway for gaseous products escaping to said exhaust flue, an upright discharge shaft forming a gas generator and located between and within the confines of said vertical walls at the lower ends thereof, said discharge shaft reaching with its upper end to said opposite end of said second grate for receiving ash and clinker from the latter, means leading into said discharge shaft for introducing air through ash and clinker in said shaft, thereby to gasify at least part of said ash and clinker, trough means located at the lowermost end of said upright discharge shaft and adapted to contain a liquid for quenching said ash and clinker, means for continuously removing ash and clinker from the lowermost end of said discharge shaft, said fuel material when delivered from said hopper to said first grate crossing said passageway defined by and between said two grates, said gaseous products when released from said vertical discharge shaft being guided past said second grate and along said passageway into said exhaust flue and deviated from said first grate and said hopper, and respective means located below said first and second grates for supplying air to the same from therebelow, said trough means extending below said pair of vertical walls, said hopper, said first grate and said discharge shaft being disposed in spaced relation to each other at said one vertical wall.

References Cited in the file of this patent

UNITED STATES PATENTS

| | | |
|---|---|---|
| 812,380 | Suzuki | Feb. 13, 1906 |
| 1,049,561 | Bradley | Jan. 7, 1913 |
| 1,363,116 | Heller et al. | Dec. 21, 1920 |
| 1,375,679 | Danner | Apr. 26, 1921 |
| 1,523,860 | Coghlan et al. | Jan. 20, 1925 |
| 1,583,436 | Atkinson | May 4, 1926 |
| 1,659,564 | Duncan | Feb. 21, 1928 |
| 1,772,285 | Knittel | Aug. 5, 1930 |
| 1,914,746 | Kay | June 20, 1933 |
| 2,269,273 | Krogh et al. | Jan. 6, 1942 |
| 2,577,659 | Knipping | Dec. 4, 1951 |
| 2,589,836 | Martin | Mar. 18, 1952 |

FOREIGN PATENTS

| | | |
|---|---|---|
| 611,293 | France | July 3, 1926 |
| 449,300 | Germany | Sept. 10, 1927 |
| 114,522 | Australia | Jan. 22, 1942 |